(12) United States Patent
Egli

(10) Patent No.: US 7,497,233 B2
(45) Date of Patent: Mar. 3, 2009

(54) PRESSURE DAMPER AND SILENCER, IN PARTICULAR FOR CONNECTIONS OF SANITARY FITTINGS

(75) Inventor: Jakob W. Egli, Hüntwangen (CH)

(73) Assignee: Conrad Frey, Zurich-Seefeld (CH)

( * ) Notice: Subject to any disclaimer, the term of this patent is extended or adjusted under 35 U.S.C. 154(b) by 433 days.

(21) Appl. No.: 10/527,019

(22) PCT Filed: Sep. 6, 2003

(86) PCT No.: PCT/EP03/09902

§ 371 (c)(1),
(2), (4) Date: Mar. 8, 2005

(87) PCT Pub. No.: WO2004/025166

PCT Pub. Date: Mar. 25, 2004

(65) Prior Publication Data

US 2006/0011248 A1 Jan. 19, 2006

(30) Foreign Application Priority Data

Sep. 9, 2002 (EP) .................................. 02020138

(51) Int. Cl.
F16L 55/04 (2006.01)
(52) U.S. Cl. .......................................... 138/30; 138/26
(58) Field of Classification Search ............. 138/26–30; 181/232, 207
See application file for complete search history.

(56) References Cited

U.S. PATENT DOCUMENTS

| | | | | |
|---|---|---|---|---|
| 2,233,804 A | * | 3/1941 | Bourne | 181/233 |
| 2,261,948 A | * | 11/1941 | Beach | 181/233 |
| 2,495,693 A | * | 1/1950 | Byrd, Jr. et al. | 138/30 |
| 2,918,091 A | * | 12/1959 | Borden | 138/30 |
| 3,038,553 A | * | 6/1962 | Peters | 181/271 |
| 4,616,732 A | * | 10/1986 | Carboni | 181/232 |
| 4,732,175 A | | 3/1988 | Pareja | |
| 6,672,337 B2 | * | 1/2004 | Kobayashi et al. | 138/30 |
| 6,948,479 B1 | * | 9/2005 | Raney et al. | 123/456 |

FOREIGN PATENT DOCUMENTS

| | | |
|---|---|---|
| DE | 36 26 337 | 2/1988 |
| DE | 196 52 111 | 6/1998 |
| DE | 198 25 543 | 12/1999 |
| EP | 1002984 A2 * | 5/2000 |
| JP | 03157598 A * | 7/1991 |
| JP | 10141573 A * | 5/1998 |
| WO | 02/42677 | 5/2002 |

* cited by examiner

Primary Examiner—Patrick F Brinson
(74) Attorney, Agent, or Firm—Renner, Otto, Boisselle & Sklar, LLP

(57) ABSTRACT

The invention relates to pressure dampers and silencers for adapters in water conduits and for fittings that are fixed onto sanitary fittings (see DIN EN 200, page 9, FIG. 8). Said dampers and silencers comprise a hose piece (14), which is surrounded by and fixed in a housing (26; 126) of the adapter or fitting and a damping element (12) between the internal hose piece and the external housing, (disclosed e.g. in EP 1.002.994 A2 (FIG. 1). To simplify and secure the installation of the elements, a dimensionally stable two-part capsule (10; 110), which encloses the damping element (12), is integrated into the separable housing (26; 126) using a positive fit.

10 Claims, 2 Drawing Sheets

PRESSURE DAMPER AND SILENCER, IN PARTICULAR FOR CONNECTIONS OF SANITARY FITTINGS

This application is a national phase of International Application No. PCT/EP2003/009902 filed Sep. 6, 2003 and published in the German language.

The invention relates to a damper according to the introductory part of claim 1.

In the case of a damper, which is known from EP 1 002 984 A2 (FIG. 1) and is in accordance with the category, for water fittings a unitary housing (1) thereof is constructed as a pipe nipple with widened internal diameter (6) and radial end faces (8, 9) for bounding the installation space for the damping element (7) and is a support of a wall rosette. For installation of the damping element this is introduced into the installation space by the widened nipple stub pipe with external thread for the connecting fastening by means of box nut at the fitting body (see DIN EN 200, page 9, FIG. 8 on the right—July 1990), whereupon this nipple stub pipe is narrowed to the internal width of the other nipple stud pipe by use of a bush (10). Only then can the hose member (2) be drawn in and clamped fast by means of flange sleeves (4 and 11).

In that case it is disadvantageous that installation of the damping element and the positional securing thereof are inconvenient and not possible in all dimensional relationships.

The invention is therefore based on the task of creating a damper according to category for connection of a sanitary fitting, which allows a simple installation of the damping element which is easy to secure.

This task is solved by the characterising features of claim 1: through the divisibility of the housing, one side thereof can be axially opened to such an extent that the damping element can be axially introduced into the enclosure, which is stiff in bending, without resilient deformation after it was laid in the predominantly open enclosure. Insertion thereof into the housing produces a mechanically positive couple between the two, which allows design of the external shape of the housing of the fitting connection independently of the respectively required shape of the damping element.

Advantageous refinements and developments of the damper according to the invention are characterised in claims 2 to 10: particularly advantageous is construction (according to claim 4) of the damping element, support pipe and hose member as a unitary cartridge, since the shape thereof can, with appropriate internal shaping of the housing of the intermediate member or connecting member, remain the same notwithstanding a variable housing shape, thus represents a fixed size in production.

The invention is explained in detail in the following on the basis of two preferred forms of embodiment, which are illustrated by way of example by the accompanying drawing, of the damper according to the invention in conjunction with the connection of sanitary fittings.

There:

Figure 4:
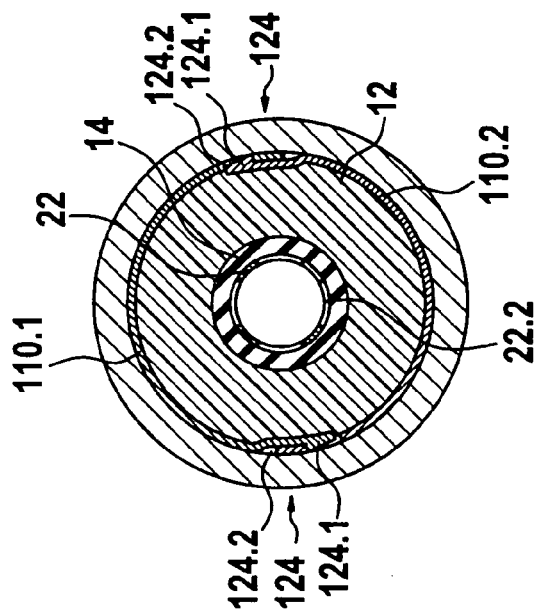
FIG. 4 shows a cross-section according to the line IV-IV in FIG. 3 through the cartridge of the second form of embodiment.
Figure 3:
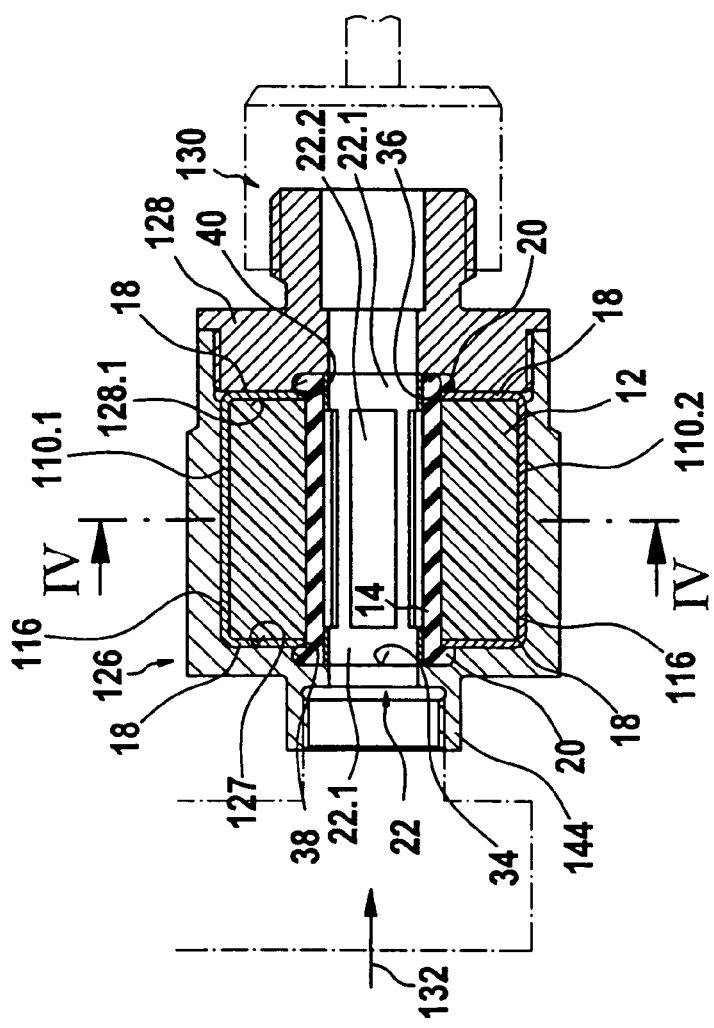
FIG. 3 shows the central longitudinal section through the second form of embodiment of a connecting member for single-hole fittings, with damper cartridge.

The two damper cartridges of the two forms of embodiment differ in the reciprocal connection of their respective two identical halves 10.1 and 10.2 or 110.1 and 110.2 of a form-stable enclosure 10 or 110 for receiving an afluidic damping element 12, which consists of an elastomer with closed pores and by its circularly cylindrical tubular shape completely fills the cavity formed on the one hand by the enclosure and on the other hand by a resilient hose member 14, which in operation conducts water and is acted on by water sound. Each enclosure 10 or 110 consists of a circularly cylindrical casing which is divided in its centre and two parallel single-part or two-part annular discs 18, which are arranged in radial planes and the bore edges of which surround the outer circumference of the hose member 14, wherein they axially inwardly contact two flange-like sealing beads 20 which are present at the ends thereof and which are radially outwardly loaded by two annular closed end portions 22.1 of a circularly cylindrical support pipe 22, which is stiff in bending, with axially parallel oblong slots 22.2. Mains water disposed under pressure passes through this slot 22.2 to the inner circumference of the hose member 14, which cooperates with the damping element 12 like a series of two springs, the rates of which are advantageously matched to one another. Whereas in the first example of embodiment the two pot-shaped halves 10.1 and 10.2 of the enclosure 10, which is divided transversely with respect to the axis, axially abut flushly and in butt-joint manner without further measures, since they adhere to the unitary damping element 12 through friction couple therewith, in the second example of embodiment the two shell-shaped halves 110.1 and 110.2 of the enclosure 110, which is divided longitudinally of the axis, are connected together by means of identical snap connections 124 which respectively consist of hooks 124.1 and eyes 124.2, as FIG. 4 illustrates; these can be disposed in paired manner in the radial centre plane of the enclosure 110 or at the two ends thereof or extend over the entire enclosure length. In summary, it is to be established that each of the two damper cartridges is an integral constructional unit of the enclosure 10 or 110 with the damping element 12, the hose member 14 with sealing beads 20 and the support pipe 22 with slots 22.2. This unit is handled as whole and inserted in a housing 26 or 126, which surrounds it, of the fitting connection before it is laterally water-tightly closed longitudinally of the axis by means of a threaded ring 28 or 128 with axially outwardly displaced outer thread 30 or 130 for a box nut which is indicated in FIG. 3, at the fitting body as far as the central water channel 32 or 132. It is essential that not only the housing 26 or 126 at one end (on the side of the cartridge remote from the threaded ring), but also the threaded ring 28 or 128 at the other end each have one of two radially inner shoulders 34 and 36 formed in mirror image as well as one of two identical encircling inner surfaces 38 and 48, against each of which a respective one of the two sealing beads 20 bears, in the case of the inner surface, with pressing by the support pipe 22 so that water tightness is present there.

Since the housing 26 or 126 has a rectangular cavity profile, in which also the threaded ring 28 or 128 is involved, and the cartridge fits in exactly, not only the outer circumferential surface of the damping element 12 bears against the inner circumferential surface of the enclosure 10 or 110, but also the outer circumferential surface thereof bears against the inner circumferential surface of the housing; moreover, one of the two enclosure discs 18 bears against a radial inner surface 27 or 127 of the housing, whilst the other disc 18 bears against the radial inner surface 28.1 or 128.1 of the screwed-in threaded ring 28 or 128. The cavity, which is formed by the housing 26 or 126 and the threaded ring 28 or 128, radially outside the water channel 32 or 132 is therefore completely filled by the cartridge.

Figure 1:
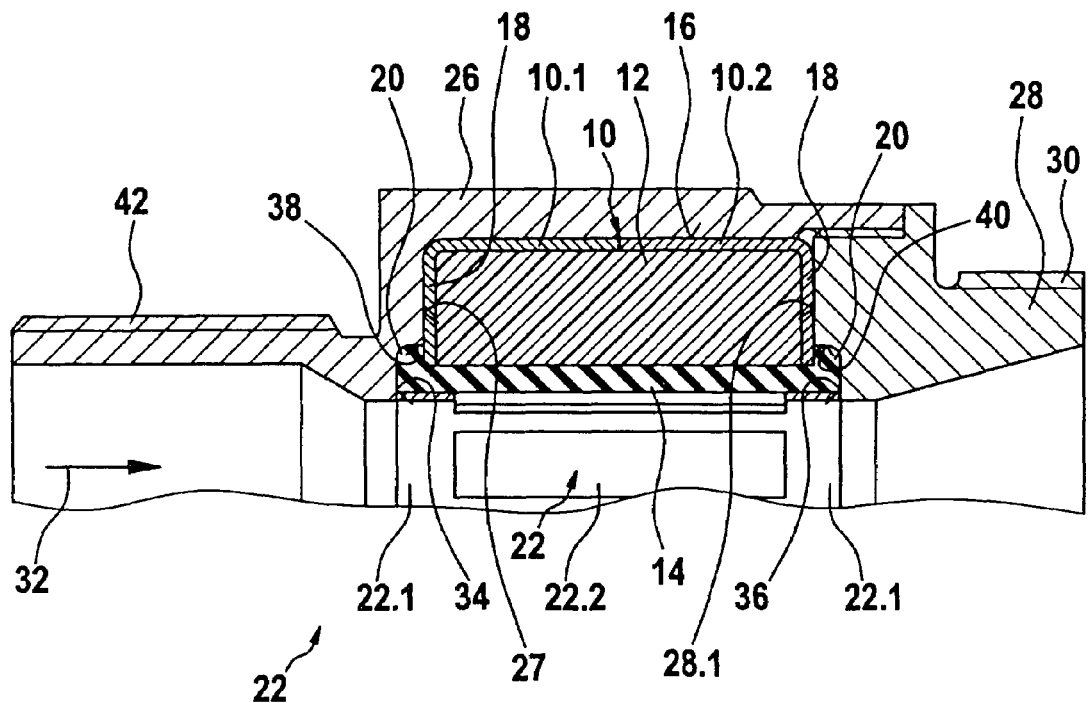
FIG. 1 shows a central longitudinal section through the first form of embodiment of a connecting member with damper cartridge, in one half.

The first form of embodiment of the damper is integrated in a connecting member which according to FIG. 1 comprises the housing 26 and at the right thereof the threaded ring 28 with offset external thread 30 for screwing on a box nut at the fitting side as well as at the left of the housing 26 a stub pipe 42 with external thread for screwing into a duct pipe end, which is at the wall side, with internal thread.

The second form of embodiment of the damper is integrated in a similar connecting member, which according to FIG. 3 comprises the similar housing 126 and thereabove the functionally identical, similar threaded ring 128 with offset external thread 130 as well as, below the housing 126, a stub pipe 144 with internal thread. It is also indicated in FIG. 3 by dot-dashed lines that in this example of embodiment a connection is conceivable of a so-called single-hole fitting to a corner valve, which is at the wall side, by way of the illustrated connecting member with incorporated damper in cartridge form.

Figure 2:
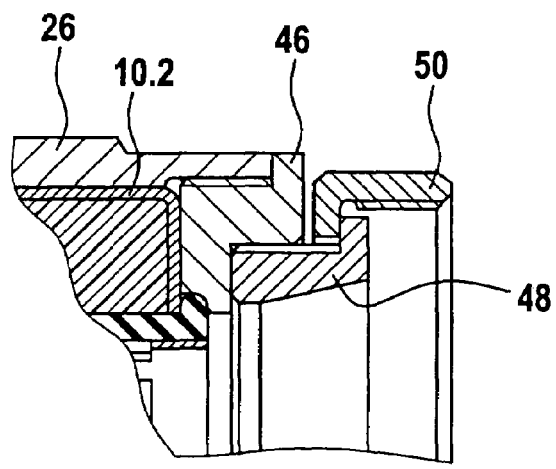
FIG. 2 shows a partly reproduced corresponding section through a variant of the connecting member (with box nut)

The first form of embodiment of the damper is also usable in conjunction with the variant, which is shown in FIG. 2, of the connecting member of FIG. 1, in which the threaded ring 28 thereof is replaced by the combination of an intermediate ring 46, which is screwed into the housing 26, and a support ring 48, which is screwed into this and on which a box nut 50 is loosely seated and is screwed to the fitting.

The invention claimed is:

1. A water-hammer and noise damper for intermediate members in water ducts and for connecting members for fastening to sanitary fittings, comprising a water-conducting resilient hose member which is radially surrounded by a rigid housing of an intermediate member or connecting member and is water-tightly fixed to the housing, a damping element water-tightly incorporated radially between the housing and hose member, and a form-stable, two-part enclosure enclosing the damping element and inserted with a positive fit in the housing, and the enclosure separating the dampening element and the housing.

2. A damper according to claim 1, wherein the hose member has at each end a flange-like sealing bead which bears against a radially inner shoulder of the housing and is radially pressed against an encircling inner surface of the housing, and wherein a radial annular disc at each end of the enclosure contacts, at a rim, the sealing bead on the side thereof remote from the inner shoulder and surrounds the hose member.

3. A damper according to claim 2, wherein the hose member is loaded radially outwardly at its sealing beads by means of annularly closed end sections of a cylindrical support pipe with slot shaped wall passages for water penetration, the support pipe carrying the hose member outside these wall passages.

4. A damper according to claim 3, wherein the damping element, the support pipe and the hose member clamped in place therebetween, together form a unitary cartridge inserted in the housing.

5. A damper according to claim 4, for intermediate and collecting members, the housings of which have a right-angular cavity profile, wherein the damping element and enclosure each have a respective one of two adjacently disposed cylindrical circumferential surfaces which are coaxial with respect to the common longitudinal axis of support pipe and unloaded hose member.

6. A damper according to claim 1, wherein the enclosure consists of two identical complementary halves and is made of deep-drawn sheet metal or injection-moulded plastics material.

7. A damper according to claim 6, wherein the enclosure is divided by a virtual cross-section in a radial plane into two halves which abut end-to-end in a butt joint.

8. A damper according to claim 6, wherein the enclosure is divided by a virtual longitudinal section in an axial plane into two halves which are held together by means of one or two identical snap connections in circumferential direction of the enclosure.

9. A damper according to claim 1, wherein the housing of the connecting member has a cylindrical inner surface and a radial end surface for support of the enclosure and the axially opposite radial end surface of the housing for support of the enclosure is formed by means of a screwed-in threaded ring which is provided with an axially offset external thread for a box nut or with an internal thread for a screwed-in flange ring as support for a box nut.

10. A damper according to claim 9, wherein the hose member has at each end a flange-like sealing bead which bears against a radially inner shoulder of the housing and is radially pressed against an encircling inner surface of the housing, and a radial annular disc of each enclosure half contacts, at a rim, the sealing bead on the side thereof remote from the inner shoulder and surrounds the hose member; and one of the two inner shoulders of the housing and one of its two encircling inner surfaces are formed at the threaded ring.

\* \* \* \* \*